3,193,512
SUPPORTED SILVER OXIDE CATALYST AND METHOD OF MAKING SAME
John E. Ciocchetti, Armenia, Caldas, Colombia, assignor to Acidos Grasos Limitada, Armenia, Caldas, Colombia, South America
No Drawing. Original application Feb. 9, 1960, Ser. No. 7,699. Divided and this application June 1, 1961, Ser. No. 114,013
14 Claims. (Cl. 252—451)

This application is a division of application Serial No. 7,699, filed February 9, 1960.

This invention relates to the partial oxidation of acetylene and it has particular relation to the preparation of ketene by partial oxidation of acetylene by means of air.

In my co-pending application Serial No. 7,699, filed February 9, 1960, of which the instant application is a division, there is described and claimed a method for reaction of acetylene with air according to the following reaction:

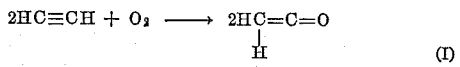

This reaction is on the whole endothermic, because the heat released by oxidation is not sufficient to balance the energy necessary for separation of the hydrogenation and for splitting the oxygen molecule.

Another object of the present invention is to provide a catalyst for diminution of the activation energy and of the temperature necessary for producing the desired reaction with satisfactory yields.

Other objects and the advantages of the invention will be apparent from the following description and claims.

It has been found that the above mentioned reaction according to scheme (I) can be carried out in satisfactory manner at relatively low temperatures with good yield in the presence of a silver oxide catalyst prepared in the manner described hereinafter.

The catalyst used according to the present invention consists of silver oxide deposited on a silica gel base consisting of the precipitate obtained by adding an acidified zinc chloride solution and a calcium chloride solution to a sodium silicate solution. In carrying out the present invention, the use of silica gel as the catalyst carrier is preferred, but the silver oxide catalyst used according to this invention can be deposited also on an andesine base or on an anorthite base in the manner described hereinafter. The andesine is a calcium feldspar having the formula $(CaNa_2)OAl_2O_3 4SiO_2$ and the anorthite is a calcium feldspar of the formula $$(CaOAl_2O_3 2SiO_2)$$

In order to prepare the silver oxide catalyst on the beforementioned gel carrier the following procedure can be used.

966 ml. of an aqueous sodium silicate solution, which contains $SiO_2$ and $Na_2O$ in a ratio of $SiO_2/Na_2O = 3.22$ and 37.8% of dissolved material based on the weight of the total solution, are dissolved in 1800 ml. of water.

A first solution of 68 grams of zinc chloride dissolved in 1300 ml. of water containing 30 ml. of 4 N aqueous solution of hydrochloric acid, and a second solution of 109 grams of calcium chloride dissolved in 1200 ml. of water, are then introduced under vigorous stirring into the sodium silicate solution and the resulting mixture is poured into a container, which is large enough to contain the resulting gel in a layer having a thickness of about one centimeter. After standing for about 2 hours, the gel is cut into small cubes of about 1 x 1 x 1 cm. and allowed to stand for two days. The cubes are then transferred to a Buchner funnel and washed therein during about 3½ hours with 8000 ml. of a 2% aqueous solution of zinc chloride. They are then washed with water, dried at 150° C. for about 4 hours and finally calcined in a muffle at 550°–600° for about 10 hours, so that the cubes will be reduced to pellets of 4 x 4 x 4 mm.

In order to precipitate the silver oxide on the cubes of carrier thus preapared, said cubes are placed in a 2-liter Erlenmeyer flask having an evacuation pipe on the side of the neck. A stopper provided with a bore is inserted in said flask and a glass tube is inserted in said bore, is connected by means of a flexible tube with a funnel provided with a stop-cock so that the funnel is placed on the top of the flask. About 1000 ml. of 0.165 N silver nitrate solution are now introduced into the funnel, a vacuum is produced in the flask and 920 ml. of the silver nitrate solution are admitted into the flask, whereupon the cock is closed. The remainder of the silver nitrate solution is then poured off, the funnel washed and 20 ml. of 28% aqueous ammonia are introduced into the funnel. 15 ml. of the ammonia solution are then gradually admitted to the flask while shaking the flask. After closing the cock, 260 ml. of a 0.7 N solution of aqueous NaOH and 8 ml. of 28% aqueous ammonia are introduced into the funnel. The liquid mixture in the funnel is now gradually admitted to the flask under shaking. After standing for about ½ hour the vacuum in the flask is terminated and the contents of the flask are introduced into a Buchner funnel to allow the liquid to drain. The resulting material is dried at 150° C. for about 4 hours and finally calcined at 360° C. for about 8 hours. The material thus obtained is then used as a catalyst in the manner described hereinafter.

Precipitation of the silver oxide on the andesine or anorthite carrier and preparation of the catalyst distributed on these carriers is carried out as follows.

400 grams of the carrier ground to pieces which pass through a 20-mesh screen, are introduced into a 3-liter Erlenmeyer flask provided with a pipe arranged on the side of the neck. The flask is provided with a stopper having a bore, in which a glass tube is introduced and this glass tube is connected with the tube of a funnel which contains a solution of 75 grams of zinc chloride in 1300 ml. of water and is placed on top of the Erlenmeyer flask. After producing a vacuum in the flask, about 1200 ml. of the zinc chloride solution is admitted to the flask by opening the cock of the funnel. As soon as 1200 ml. of the zinc chloride solution are introduced into the flask, the cock of the funnel is closed and the remainder of the zinc chloride solution is poured off. The funnel is then washed and 8 ml. of 28% aqueous ammonia solution and 100 ml. of water are introduced into the funnel. Then, by opening the cock of the funnel, the ammonia is introduced into the flask under vigorous shaking.

After standing for about ½ hour, air is admitted to the flask and its contents is discharged into a Buchner funnel in order to allow the excess liquid to drain. The material is then dried for about 4 hours at 150° C. formed to pellets of 4 x 4 x 4 mm. and finally calcined at about 550° C. for 10 hours.

Precipitation of the silver oxide on the andesine or anorthite carrier or base is carried out in the manner described above in connection with the precipitation on the silica gel carrier.

The reaction according to the above scheme I can be carried out preferably in reactors consisting of two coaxial tubes. The catalyst is placed in the space between the two tubes so as to fill somewhat more than half of this space. Acetylene is passed through this space whereby air is introduced into the acetylene through the center tube. The air should be admitted into the acetylene in small quantities so that the air content of the acetylene does not exceed about 20% by volume. In order to introduce the air into the reaction space, the central tube must be provided with the necessary number of suitably dimensioned holes suitably spaced relative to each other. The reaction can be carried out in the temperature range of 98° to 220° C. and the optimum reaction temperature is 98°–107° C.

During one passage through a reactor which has a length of three meters, is formed by a center tube of 6 to 10 mm. diameter and an outer tube of 30 to 40 mm. diameter, a conversion of the acetylene of up to 55% is obtained, whereby 4 to 6 liters of acetylene mixed with air are passed through the reactor and the catalysts, at a temperature of 98°–100° C., during 1 second.

The gases discharged from the reactor are immediately cooled and the ketene is made to react with acetic acid or an alcohol to produce acetic anhydride or an acetic acid ester. Or the gases are absorbed in a limited quantity of acetone, in which the ketene dimerizes readily to diketene (B.P. 127° C.) which will absorb the subsequently incoming ketene. After a short period of time, there will be a greater quantity of diketene than acetone in the absorption vessel so that only the ketene will be absorbed with a very small quantity of acetylene, while the excess of acetylene can be recycled. The carbon dioxide which may have been formed is absorbed by NaOH solution before the acetylene is recycled.

It will be understood that the above examples represent specific embodiments of and a best mode for carrying out the invention, to which the invention is not limited.

According to the present invention, instead of the feldspars named above, other calcium feldspars can also be used. The absence of moisture in the carrier and the presence of zinc oxide and calcium oxide therein are necessary for successfully carrying out the invention. The silver oxide should be present in the catalyst+carrier mixture in an amount in the range of 6–10% and the zinc oxide should be present in an amount of 8–10% and the calicum oxide in an amount of 10–15%, in the catalyst+carrier mixture.

The minimum concentration, in which oxygen (in the form of air) should be present in the reaction mixture is 1 volume of oxygen for 100 volumes of acetylene. Oxidation of the acetylene according to this invention is effected by air, but other mixtures of oxygen and nitrogen which are similar to air can likewise be used. The term "air" is, therefore, used herein to include such mixtures too.

It will be understood from the above that this invention is not limited to the specific steps, conditions, arrangements and other details specifically described above and can be carried out with various modifications without departing from the scope of the invention, as defined in the appended claims.

The parts and percent stated herein are by weight if not otherwise stated. The term "20-mesh screen" is used herein to denote a screen having 20 meshes in 1" length, the free space per mesh being about 0.83 mm.

What is claimed is:

1. A process for preparing a catalyst for the partial oxidation of acetylene to ketene with air, comprising mixing an aqueous silver nitrate solution with an inorganic carrier, selected from the group consisting of silica gel containing about 8–10% of zinc oxide and about 10–15% of calicum oxide and calcium feldspar containing about 8–10% of zinc oxide, precipitating about 6–10% of silver oxide on the carrier from said solution by the addition of a base to said solution, allowing the liquid to drain and drying and calcining the remaining solids.

2. A process for preparing a catalyst for the partial oxidation of acetylene to ketene with air, comprising preparing a silica gel by adding to an aqueous sodium silicate solution an acidified aqueous solution of about 8–10% of zinc chloride, and an aqueous solution of about 10–15% of calcium chloride, washing, drying, and calcining said gel, mixing said gel with an aqueous silver nitrate solution, precipitating about 6–10% of silver oxide on the gel by the addition of ammonia to the mixture, allowing the liquid to drain and drying and calcining the remaining solids.

3. A process for preparing a catalyst for the partial oxidation of acetylene to ketene with air, comprising mixing comminuted andesine containing about 10–15% of calcium oxide with an aqueous about 8–10% zinc chloride solution and precipitating zinc chloride by adding to the resulting mixture ammonia; mechanically separating the liquid from the solids and drying and calcining the remaining solids; mixing said solids with an aqueous silver nitrate solution, precipitating about 6–10% of silver oxide on the solids by the addition of ammonia to the mixture, allowing the liquid to drain and drying and calcining the remaining solids.

4. A process for preparing a catalyst for the partial oxidation of acetylene to ketene with air, comprising mixing comminuted anorthite containing about 10–15% of calcium oxide with an aqueous about 8–10% zinc chloride solution and precipitating zinc chloride by adding to the resulting mixture ammonia; mechanically separating the liquid from the solids and drying and calcining the remaining solids; mixing said solids with an aqueous silver nitrate solution, precipitating about 6–10% of silver oxide on the solids by the addition of ammonia to the mixture, allowing the liquid to drain and drying and calcining the remaining solids.

5. A catalyst for the partial oxidation of acetylene to ketene with air, consisting of about 6–10% of silver oxide distributed on an inorganic carrier selected from the group consisting of silica gel containing about 8–10% of zinc oxide and about 10–15% of calcium oxide, and calcium feldspar of about 10–15% calcium oxide content containing about 8–10% of zinc oxide.

6. A catalyst as claimed in claim 5, in which the inorganic carrier is a silica gel containing about 8–10% of zinc oxide and about 10–15% of calcium oxide.

7. The process according to claim 1, wherein said carrier is silica gel containing zinc oxide and calcium oxide.

8. The process according to claim 1, wherein said carrier is calcium feldspar containing zinc oxide.

9. The process according to claim 8, wherein said calcium feldspar is andesine.

10. The process according to claim 8, wherein said calcium feldspar is anorthite.

11. The catalyst according to claim 5, wherein said carrier is calcium feldspar containing zinc oxide.

12. The catalyst according to claim 11, wherein said calcium feldspar is andesine.

13. The catalyst according to claim 11, wherein said calcium feldspar is anorthite.

14. A process for preparing a catalyst for the partial oxidation of acetylene to ketene with air, comprising preparing a silica gel by adding to about 966 ml. of an aqueous sodium silicate solution, which contains $SiO_2$ and $Na_2O$ in the ratio of 3.22 and about 37.8% by weight of dissolved material, an aqueous solution of 68 grams of zinc chloride and 30 ml. of 4 N hydrochloric acid in about 1300 ml. of water and a solution of about 109 grams of calcium chloride in about 1200 ml. of water so as to form a precipitate, washing drying and calcining said gel, mixing said gel with about 950 ml. of 0.165 N silver nitrate solution, precipitating silver oxide on the gel from the solution by the addition of ammonia to the mixture, allowing the liquid to drain, and drying and calcining the remaining solids.

References Cited by the Examiner
UNITED STATES PATENTS

| | | | |
|---|---|---|---|
| 2,765,283 | 10/56 | Sacken | 252—441 |
| 2,825,701 | 3/58 | Hermann et al. | 252—475 |
| 3,023,226 | 10/62 | England et al. | 252—457 X |

MAURICE A. BRINDISI, *Primary Examiner.*

JULIUS GREENWALD, *Examiner.*